J. SHERTZER & A. H. PETTIGROVE.
COMBINED REFRIGERATOR AND ICE WEIGHING APPARATUS.
APPLICATION FILED JUNE 1, 1915.
1,236,776.
Patented Aug. 14, 1917.
3 SHEETS—SHEET 2.
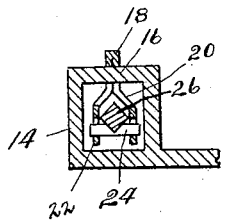
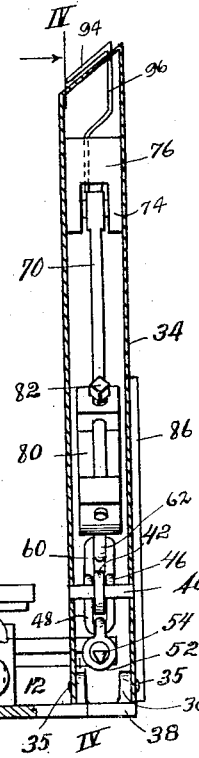
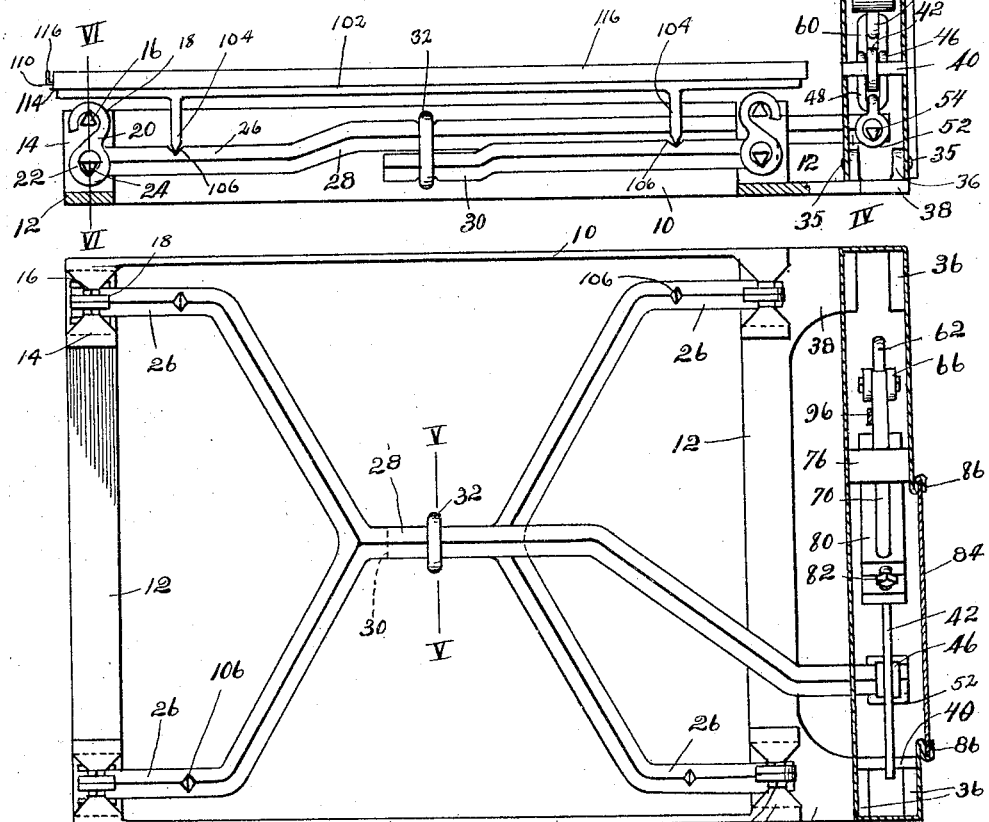

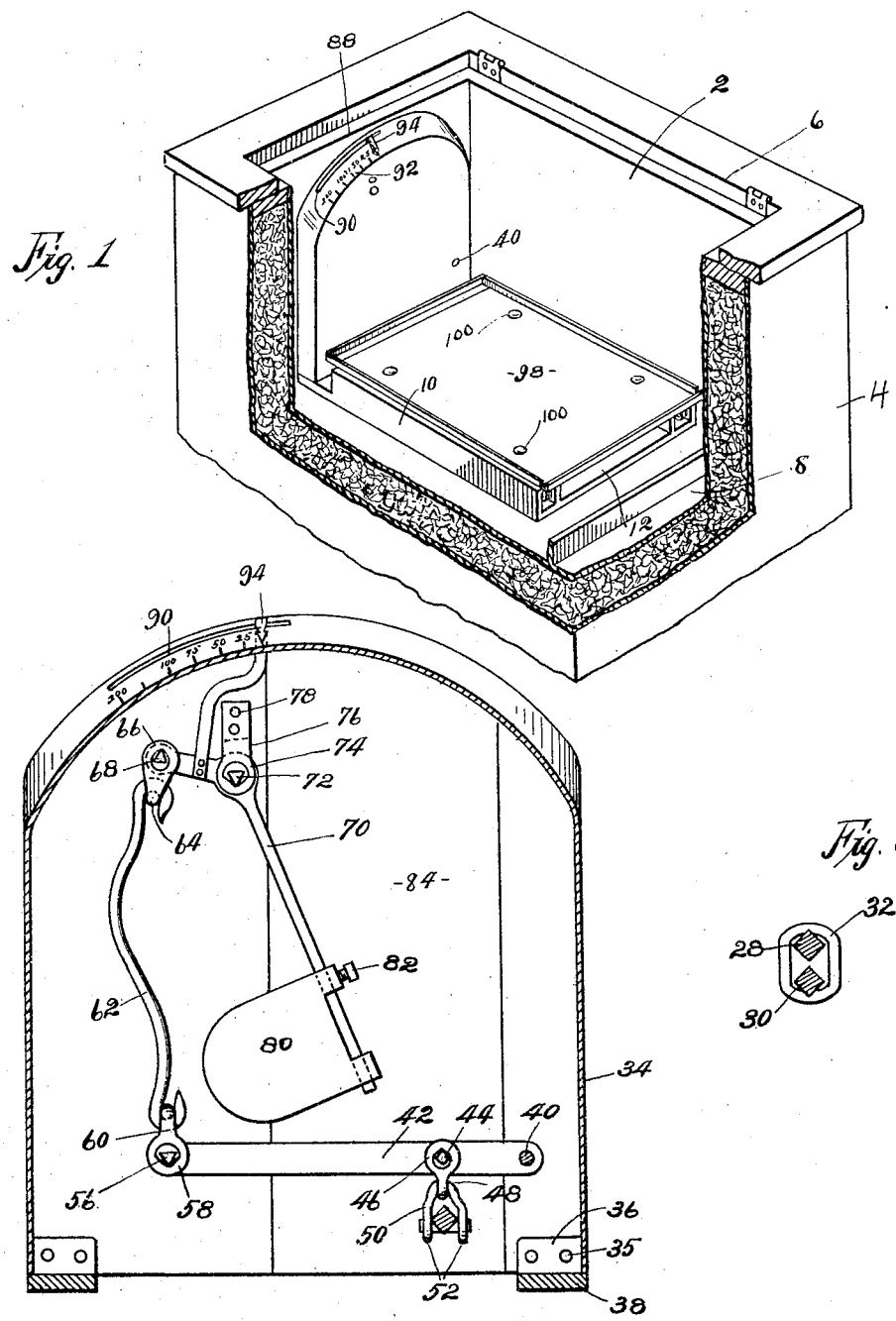

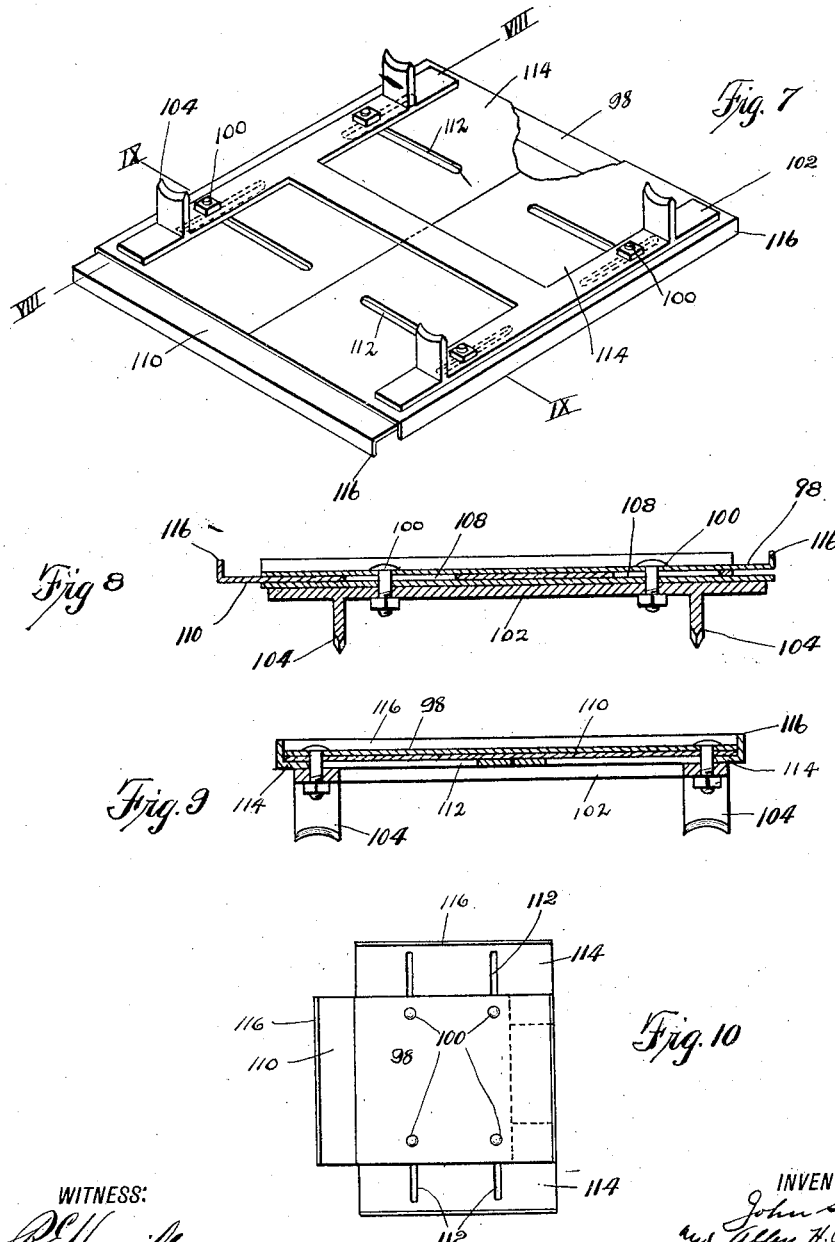

UNITED STATES PATENT OFFICE.

JOHN SHERTZER AND ALLEN H. PETTIGROVE, OF DEWEY, OKLAHOMA.

COMBINED REFRIGERATOR AND ICE-WEIGHING APPARATUS.

1,236,776.  Specification of Letters Patent.  Patented Aug. 14, 1917.

Application filed June 1, 1915. Serial No. 31,414.

*To all whom it may concern:*

Be it known that we, JOHN SHERTZER and ALLEN H. PETTIGROVE, citizens of the United States, residing at Dewey, in the county of Washington and State of Oklahoma, have invented certain new and useful Improvements in Combined Refrigerators and Ice-Weighing Apparatus, of which the following is a full and exact specification.

This invention relates to refrigerator structures, and aims to provide the ice compartment of the refrigerator with an ice support having associated therewith an ice-weighing mechanism whereby the weight of the ice upon the support may at any given time be noted by observing an index located near one of the margins of the ice compartment. It is also an object to adapt the index and scale by which the weight of the ice is registered so as to be noted and read conveniently whether the ice compartment is of the top or side door type.

A further object is to provide an ice support which is both laterally and longitudinally adjustable for accurately fitting the ice compartment with which it is to be used.

With these and other objects in view, as will appear in the course of the following description, the invention will now be described with reference to one form of embodiment thereof which has been found to be suitable and efficient in practice, after which those features and combinations which are deemed to be novel will be severally specified in the appended claim. In the accompanying drawings, forming a part of this specification, Figure 1 is a perspective view of the ice compartment of a refrigerator (partly broken away) with our improvements embodied therein;

Fig. 2 is a plan view (partly in section) of the weighing apparatus with the ice-supporting member removed;

Fig. 3 is a side elevation, partly in section;

Fig. 4 is a section on the line IV—IV of Fig. 3;

Fig. 5 is a section on the line V—V of Fig. 2;

Fig. 6 is a section on the line VI—VI of Fig. 3;

Fig. 7 is a bottom perspective view of the ice-supporting member;

Figs. 8 and 9 are sections on the lines VIII—VIII and IX—IX, respectively, of Fig. 7; and Fig. 10 is a top plan view of the ice-supporting member (on a reduced scale), showing the parts extended.

Referring to the drawings, a partial view of the ice compartment portion 2 of a refrigerator 4 is represented in Fig. 1, and as having the door opening 6 at the top thereof, the weighing mechanism being adapted to rest upon the floor 8 of said compartment. This weighing mechanism is constructed with a base frame of substantially rectangular form for resting upon the floor 8 and having the longitudinal members 10 (see Figs. 2 and 3) and the cross members 12 at the ends of the longitudinal members. At the corners of this frame are provided the brackets 14 formed with the knife edges 16 for engagement by the hooked portions 18 of the swinging links 20, which latter are provided with the depending loops or eyes 22. Within these loops or eyes 22 are designed to be mounted the knife edges 24 which project laterally from the ends of the arms 26 of the scale levers 28, 30, respectively, which are of general Y form and so curved as to bring their stem portions over each other in parallel relation midway between the cross members 12, where said stem portions are connected by the loop 32.

The stem of the upper scale lever 28 is extended and bent laterally on over one of the cross members 12 and into an oblong vertical casing 34 (see Figs. 3 and 4) which is secured at its opposite sides by means of rivets or bolts 35 to the pairs of vertical lugs 36 provided on the short extensions 38 of the members 10. Within this casing 34 is pivoted at 40 one end of a horizontal lever 42 having intermediate its ends the knife edge lugs 44 projecting into the eyes 46 of the clip 48, which latter engages a clip 50 having the eyes 52 for supporting the knife edge projections 54 on the end of the scale arm 28. At its other end the lever 42 has the pair of knife edges 56 projecting into the eyes 58 of the clip 60 to which is hooked one end of the vertically extending link 62 having its upper end hooked into the clip 64, the eyes 66 of which are in engagement with the knife edges 68 on one end of a lever 70. This latter lever is provided, intermediate its ends, with the knife edge lugs 72 which are mounted in a pair of eyes 74 of a bracket 76 secured rigidly by the fastenings 78 near the upper interior portion of the casing 34. The long arm of the lever 70 extends at an angle downwardly from the bracket 76 and has adjustably mounted thereon the bob or counterweight 80. To obtain access to the interior of the casing 34 for adjustment of this bob or other inspection, the casing is fitted with a slide plate or door 84 mounted in the vertical slide-ways 86 provided on one of the side faces of the casing. The upper wall of the casing 34 slopes laterally from the adjacent top margin 88 of the ice compartment (see Fig. 1) and downwardly toward the bottom of said compartment, and is provided with a longitudinal slot 90 having one margin thereof graduated to provide a suitable scale 92 along which moves an index finger 94, the arm 96 of which is secured at its lower end to the short arm of the lever 70, as shown in Fig. 4.

Referring more particularly to Figs. 7 to 10 of the drawings, these views illustrate the character of the ice-supporting member, which serves both as a support for the ice in the compartment 2 and also as a platform for the ice weighing mechanism, above described. This supporting member comprises an upper plate section 98 provided with the bolts 100 to the lower ends of which are secured a frame 102 having the series of depending lugs 104 provided with suitable knife-edge portions for engagement with the recesses 106 located at corresponding points on the arms 26 of the scale levers. The frame 102 is of general I shape, the length of which is approximately the same as that of the section 98, which latter represents the minimum size (i. e., area) of the supporting member. Beneath the section 98 and slidingly engaging the bolts 100 by means of the slots 108 is a movable plate section 110, which is thus adjustable for varying the length of the supporting member. Beneath this member 110 is further mounted in sliding engagement with the bolts 100 by means of slots 112 a divided plate section comprising the two parts 114 that are movable in opposite directions at right angles to the movement of the section 110, for the purpose of varying the width of the ice-supporting member. By this construction is obtained a supporting member for the ice which is adjustable as to both its length and width to fit accurately the cross-sectional area of the ice compartment 2, which adjustment may be made within reasonable limits without affecting the operation of the ice-weighing mechanism. Suitable side flanges 116 are provided on the supporting member by striking up the outer margins of the various parts thereof.

From the foregoing it will be apparent that a very simple and durable construction has been devised for effectively carrying out the various objects of the invention; that by means of the index mounted in the manner described, the weight of the ice may be readily ascertained (without the necessity of a separate weighing means) as soon as it has been placed upon the supporting member, or at any later period when it may be desired to know the weight of the ice remaining in the compartment; that the manner of mounting the index and index scale in a position inclining laterally downward and away from the upper margin of the ice compartment renders it possible to make a reading therefrom whether the ice compartment is one which opens from the top or from the side; and also that the weighing mechanism may readily be adapted to slightly varying sizes of ice compartments by merely making the required adjustment of the parts comprising the supporting member.

Claim:

In a refrigerator construction, the combination with the ice compartment, of ice-weighing mechanism supported within said compartment and provided with an ice-supporting platform comprising superposed sections, one of said sections having depending knife-edge lugs for mounting the same in a fixed predetermined working position with relation to said mechanism, and the other sections of said platform being adjustable horizontally with reference to the first section for adapting the platform to fit the cross-sectional dimensions of the compartment, the arrangement of said platform and mechanism being such as to permit free lifting of the platform vertically within said compartment and out of engagement with said mechanism while maintaining the parts of the latter substantially stationary.

JOHN SHERTZER.
ALLEN H. PETTIGROVE.